(12) United States Patent
Dietl et al.

(10) Patent No.: US 8,385,395 B2
(45) Date of Patent: Feb. 26, 2013

(54) METHOD AND APPARATUS FOR DETERMINING A QUANTIZED CHANNEL VECTOR

(75) Inventors: Guido Dietl, Munich (DE); Olivier Labreche, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 306 days.

(21) Appl. No.: 12/703,882

(22) Filed: Feb. 11, 2010

(65) Prior Publication Data
US 2010/0202503 A1 Aug. 12, 2010

(30) Foreign Application Priority Data
Feb. 12, 2009 (EP) .................................... 09001966

(51) Int. Cl.
H04B 3/46 (2006.01)
H04B 17/00 (2006.01)

(52) U.S. Cl. ........................................ 375/227; 375/224
(58) Field of Classification Search ............... 375/227, 375/267, 224
See application file for complete search history.

(56) References Cited

U.S. PATENT DOCUMENTS

| 2006/0093065 | A1* | 5/2006 | Thomas et al. | 375/299 |
| 2008/0175394 | A1* | 7/2008 | Goodwin | 381/1 |
| 2008/0227495 | A1 | 9/2008 | Kotecha et al. | |

FOREIGN PATENT DOCUMENTS

| EP | 1863192 A1 | 5/2007 |
| EP | 1998470 A2 | 3/2008 |
| JP | 2008301494 A | 11/2008 |
| WO | WO-2006106693 A1 | 10/2006 |

OTHER PUBLICATIONS

NTT-DOCOMO: "Investigation on Precoding Scheme for Mumimo in E-Utra Downlink"3GPP Draft, R1-072422 Precoding Scheme for DL MU-MIMO, 3rd Generation Partnership Project (3GPP); Mobile Competence Centre; 650; Route Des Lucioles; F-06921 Sophia-Antipolis Cedex; France; vol. RAN WG1, Japan, May 2, 2007 XP05010614.*

European Search Report dated Jul. 15, 2009 issued in the priority application EP09001966.2.

NTT Docomo: "Investigation on Precoding Scheme for MUMIMO in E-Utra Downlink"3GPP Draft, R1-072422 Precoding Scheme for DL MU-MIMO, 3rd Generation Partnership Project (3GPP); Mobile Competence Centre; 650; Route Des Lucioles; F-06921 Sophia-Antipolis Cedex; France; vol. RAN WG1, Japan, May 2, 2007 XP050106148.

(Continued)

*Primary Examiner* — David C. Payne
*Assistant Examiner* — Brian J Stevens
(74) *Attorney, Agent, or Firm* — Nutter McClennen & Fish LLP; John J. Penny, Jr.; Christina M. Sperry (57) ABSTRACT

A method for determining a quantized channel vector in a terminal of a Multiple Input Multiple Output communication system includes determining a channel quality of a channel between a base station and the terminal and determining the quantized channel vector from a plurality of quantized channel vectors based on the determined channel quality. The determined quantized channel vector provides a predefined channel property value.

8 Claims, 9 Drawing Sheets

OTHER PUBLICATIONS

Philips: IIcomparison Between MU-MIMO Codebook-Based Channel Reporting Techniques for LTE Downlink Oct. 4, 2006; R1-062483; Mobile Competence Centre XP050103007.

B. Borloz and B. Xerri. Subspace signal-to-noise ratio maximization: the constrained stochastic matched filter. Signal Processing and Its Applications, 2005. Proceedings of the Eighth International Symposium on, 2:735-738, 28-31, 2005.

N. Jindal. A feedback reduction technique for MIMO broadcast channels. Information Theory, 2006 IEEE International Symposium on, pp. 2699-2703, Jul. 2006.

Philips. Comparison of MU-MIMO feedback schemes with multiple UE receive antennas, Jan. 2006. 3GPP TSG RAN WG1 #47bis R1-070346.

M. Trivellato, F. Boccardi, and F. Tosato. User selection schemes for MIMO broadcast channels with limited feedback. Vehicular Technology Conference, 2007. VTC2007-Spring. IEEE 65th, pp. 2089-2093, Apr. 2007.

S. Verdu. Multiuser Detection. Cambridge University Press, 1998.

Japanese Office Action Application No. 2010-027847, dated Dec. 6, 2011.

* cited by examiner

METHOD AND APPARATUS FOR DETERMINING A QUANTIZED CHANNEL VECTOR

CROSS-REFERENCE TO RELATED APPLICATION

This application claims priority from European Patent Application No. 09001966.2, which was filed on Feb. 12, 2009, and is incorporated herein in its entirety by reference.

BACKGROUND OF THE INVENTION

Embodiments according to the invention relate to communication systems and, more particularly, to a method and an apparatus for determining a quantized channel vector in a terminal of a Multiple Input Multiple Output communication system.

For example, for downlink transmission in a multiuser Multiple Input Multiple Output (MIMO) communication system, quantized Channel State Information (CSI) is fed back to the base station in an uplink channel of finite rate. The quantized CSI may be obtained by quantizing the product of the channel matrix and an estimation of the receive filter, in the following denoted as the composite channel vector, which cannot be computed exactly at the stage of quantization because of its dependency on the finally chosen precoder. The state-of-the-art method estimates the receive filter and quantizes the composite channel vector, for example, that its Euclidean distance to the estimated composite channel vector is minimized.

Figure 2:
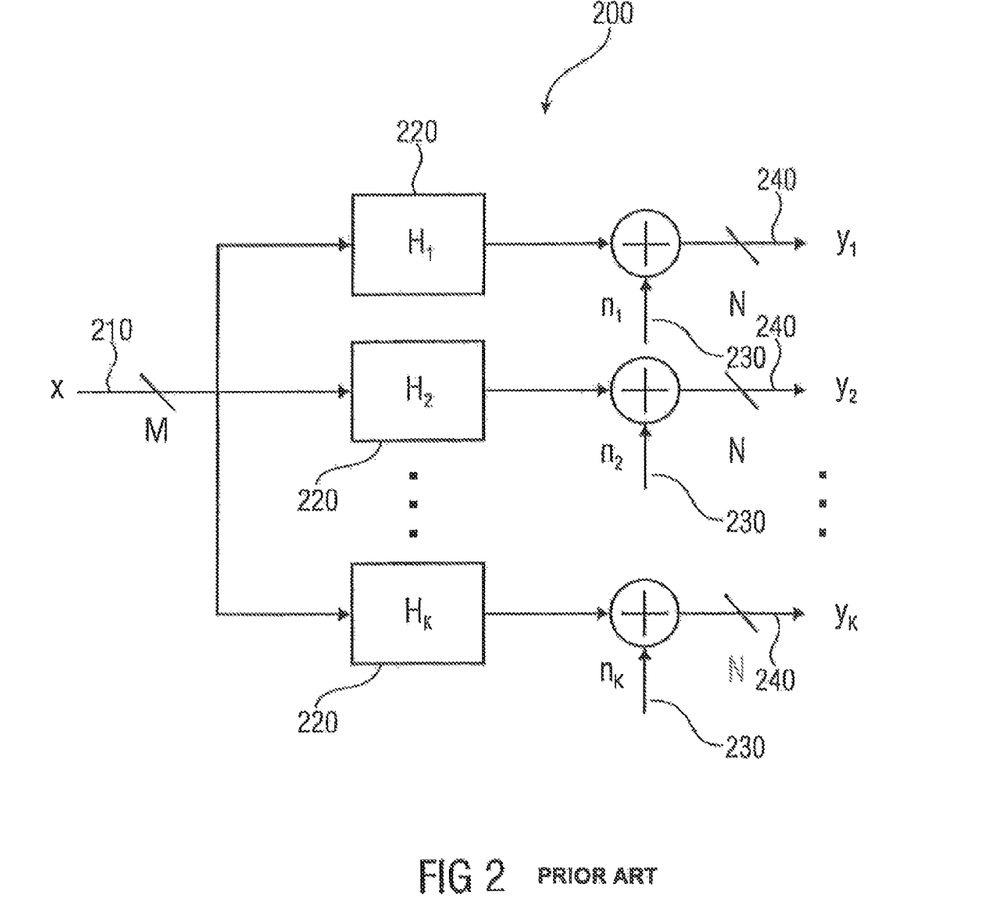
FIG. 2 is a schematic illustration of a downlink channel of a multiuser Multiple Input Multiple Output system.

In the downlink 200 (channel) of a multiuser MIMO system as depicted in FIG. 2, the scheduled and precoded symbols, summarized in the vector $x \sim N_C(0_M, C_x)$ 210, are transmitted via the M antennas of the base station to the K mobile stations, each equipped with N receive antennas. Note that the transmit power at the base station is $P_{TX}=\mathrm{tr}(C_x)$. With the kth user's channel matrix $H_k \in C^{N \times M}$, $k \in \{1, \ldots, K\}$ 220, and the noise vector $n_k \sim N_C(0_N, I_N)$ 230 with independent and normal distributed elements of variance one, the perturbed receive vector 240 of the kth user can be written as $$y_k = H_k x + n_k \in \mathbb{C}^N. \quad (1)$$

Linear precoder and receivers are used and it is assumed that the scheduler has already selected the users for transmission which are summarized in the set $K \subset \{1, \ldots, K\}$. In particular, $d_k$ data symbols of variance $P_{TX}/D$, summarized in the following in the symbol vector $s_k \in \mathbb{C}^{d_k}$, have been assigned to user k. Therefore, the total number of transmitted symbols is $D = \Sigma_{k \in K} d_k$.

Then, each symbol vector is precoded using the precoders $P_k \in C^{M \times d_k}$, and summed up to get the transmit vector $$x = \sum_{k \in K} P_k s_k = Ps. \quad (2)$$

Here, $P \in C^{M \times D}$ is a matrix where the precoders $P_k, k \in K$, are stacked in a row with ascending k, in the following denoted as $P = \mathrm{rstack}(P_k)_{k \in K}$, and $s \in \mathbb{C}^D$ is a vector where the symbol vectors $s_k, k \in K$, are stacked in a column with ascending k, in the following denoted as $s = \mathrm{cstack}(s_k)_{k \in K}$.

Next, we describe the receivers at the mobile stations. We assume that each user is applying a linear filter $W_k \in C^{d_k \times N}$ to the receive vector $y_k$ to get the estimate $$\hat{s}_k = W_k y_k \in \mathbb{C}^{d_k}. \quad (3)$$

of the kth user's symbol vector $s_k$. In particular, we consider the linear Minimum Mean Square Error (MMSE) filter obtained via the minimization of the mean-square error between $s_k$ and $\hat{s}_k = W_k y_k$, whose solution computes as (e.g. "S. Verdú. Multiuser Detection. Cambridge University Press, 1998.")

$$W_k = P_k^H H_k^H \left( H_k P P^H H_k^H + \frac{D}{P_{Tx}} I_N \right)^{-1}. \quad (4)$$

Note that it is assumed that each receiver has access to the perfect Channel State Information (CSI) of its own channel $H_k$. However, it has no CSI about the channels of the other users due to the non-cooperative nature of the multiuser MIMO downlink channel.

A typical measure for the downlink transmission performance of a multiuser MIMO system is the sum rate over all users. In the following, it is assumed that maximal one data stream is assigned to each user, i.e., $d_k \in \{0, 1\}$. Consequently, the precoding and receiver matrix of each scheduled user $k \in K$, viz., $P_k \in C^{M \times d_k}$ and $W_k \in C^{d_k \times N}$, shrink to a vector, in the following denoted as $P_k \in C^M$ and $w_k^T \in C^{1 \times N}$, respectively. Besides, the number of scheduled users is equal to the number of scheduled data streams, i.e., $|K|=D$.

With this assumption, the Signal-to-Interference-and-Noise Ratio (SINR) at the output of the receive filter $w_k^T$ of the kth user can be written as $$\gamma_k = \frac{|w_k^T H_k p_k|^2}{\|w_k\|_2^2 \frac{D}{P_{Tx}} + \sum_{\substack{i \in K \\ i \neq k}} |w_k^T H_k p_i|^2}, \quad (5)$$

and the sum rate computes as $$R_{sum} = \sum_{k \in K} \log_2(1 + \gamma_k). \quad (6)$$

Remember that the variance of each user's symbol is set to $P_{Tx}/D$.

For example, in order to compute the precoder and schedule the users for transmission, the base station needs information about the channel matrices $H_k$ for all $k \in \{1, \ldots, k\}$. This so-called Channel State Information (CSI) is fed back from the terminals to the base station. Precisely speaking, each user quantizes its channel based on a channel codebook and feeds back the corresponding codebook index together with an SINR value which includes a rough estimate of the interference caused by the quantization error (see e.g. "M. Trivellato, F. Boccardi, and F. Tosato. User selection schemes for MIMO broadcast channels with limited feedback. *Vehicular Technology Conference,* 2007. VTC2007-*Spring. IEEE* 65th, pages 2089-2093, April 2007", "Philips. Comparison between MU-MIMO codebook-based channel reporting techniques for LTE downlink, October 2006. 3GPP TSG RAN WG1 #46 R1-062483", "Philips. Comparison of MU-MIMO feedback schemes with multiple UE receive antennas, January 2006. 3GPP TSG RAN WG1 #47bis R1-070346" and "N. Jindal. A feedback reduction technique for MIMO broadcast channels. *Information Theory,* 2006 *IEEE International Symposium* on, pages 2699-2703, July 2006.") The base station is then computing a precoder, e.g. of type Zero- Forcing (ZF), based on the quantized CSI and allocates resources using the available SINR information.

Again, since low feedback schemes are of interest, the maximum number of transmitted data symbols per user may be restricted to one, i.e., $d_k=1$ for all $k \in K$.

For channel vector quantization (CVQ) and feedback of channel quality indicator (CQI) it may be assumed for the first that the precoder P is known at the mobile receivers such that the MMSE filters $W_k = w_k^T \in \mathbb{C}^{1 \times N}$ can be computed according to Eq. (4). In order to compute the feedback information, each user k quantizes the composite channel vector $g_k^T = w_k^T H_k \in \mathbb{C}^{1 \times M}$, being a combination of the linear MMSE filter and the physical channel matrix, by applying Channel Vector Quantization (CVQ). With the channel codebook $C = \{u_1, \ldots, u_{2^B}\}$ where B denotes the number of necessary bits for indexing the $2^B$ normalized codebook vectors $u_q$, $q \in \{1, \ldots, 2^B\}$.

The quantized composite channel vector $\hat{g}_k \in \mathbb{C}^M$ is the codebook entry which has the minimum Euclidean distance to the normalized composite channel vector, i.e., for $k \in K$:

$$\hat{g}_k = u_l, \ l = \underset{q \in \{1, \ldots, 2^B\}}{\operatorname{argmax}} |u_q^H g_k| / \|g_k\|_2. \quad (7)$$

Here, l denotes the codebook index which is fed back to the base station using B bits. Note that the codebook index provides only the direction of the channel vector whereas the magnitude is included in the SINR value which is also part of the feedback information. As derived in "M. Trivellato, F. Boccardi, and F. Tosato. User selection schemes for MIMO broadcast channels with limited feedback. Vehicular Technology Conference, 2007. VTC2007-Spring. IEEE 65th, pages 2089-2093, April 2007" or "Philips. Comparison of MU-MIMO feedback schemes with multiple UE receive antennas, January 2006. 3GPP TSG RAN WG1 #47bis R1-070346", a scaled version of the SINR at the kth mobile receiver is approximated via $$\gamma_k' = \frac{\frac{P_{Tx}}{M} \|g_k\|_2^2 \cos^2 \theta_k}{1 + \frac{P_{Tx}}{M} \|g_k\|_2^2 \sin^2 \theta_k}, \quad (8)$$

where $\cos \theta_k = |g_k^H \hat{g}_k| / \|g_k\|_2$. and $\theta_k \in [0, \pi]$ denotes the angle between the normalized composite channel vector and the quantized version thereof. Without loss of generality, we set $\|w_k\|_2 = 1$ for the SINR computation. Again, note that the scaled SINR value in Eq. (8) includes an approximation of the interference caused by the ZF approach due to the quantization error.

It remains to explain how the users can approximate the composite channel vector $g_k$ without knowing the precoder P at the base station. For example, the ideas of "N. Jindal. A feedback reduction technique for MIMO broadcast channels. *Information Theory*, 2006 *IEEE International Symposium on*, pages 2699-2703, July 2006" may be followed, where the composite is chosen as a linear combination of the rows of $H_k$ such that the quantization error is minimized. With the QR factorization of $H_k^T = Q_k R_k$ where $Q_k \in \mathbb{C}^{M \times N}$ is a matrix with orthonormal columns and $R_k \in \mathbb{C}^{N \times N}$ is upper triangular, the CVQ of the composite channel vector is obtained by choosing the codebook entry in C which is closest to the row space of $H_k$ with respect to the Euclidean distance:

$$\hat{g}_k = u_l, \ l = \underset{q \in \{1, \ldots, 2^B\}}{\operatorname{argmax}} \|Q_k^H u_q\|_2^2. \quad (9)$$

Using the Euclidean distance in this way, the minimum Euclidean distance is a property of the codebook and the quantization.

Then, the approximation of the composite channel vector is obtained by projecting $\hat{g}_k$ back into the row space of $H_k$ $$\tilde{g}_k = Q_k Q_k^H \hat{g}_k / \|Q_k Q_k^H \hat{g}_k\|_2, \quad (10)$$

and applying the scaling $$g_k = \tilde{g}_k / \|\tilde{g}_k^T H_k^\dagger\|_2. \quad (11)$$

where $H_k^+ = H_k^H (H_k H_k^H)^{-1}$ is the right-hand side pseudo-inverse of the matrix $H_k$. Applying $g_k$ of Eq. (11) to Eq. (8) yields the CQI value which is the additional feedback information to the codebook index l.

SUMMARY

According to an embodiment, a method for determining a quantized channel vector in a terminal of a Multiple Input Multiple Output communication system may have the steps of: determining a channel quality of a channel between a base station and the terminal; and determining the quantized channel vector from a plurality of quantized channel vectors based on the determined channel quality, wherein the determined quantized channel vector provides a predefined channel property value.

According to another embodiment, an apparatus for determining a quantized channel vector in a terminal of a Multiple Input Multiple Output communication system may have: a channel quality determiner configured to determine a channel quality of a channel between a base station and the terminal; and a processor configured to determine the quantized channel vector from a plurality of quantized channel vectors based on the determined channel quality, wherein the determined quantized channel vector provides a predefined channel property value.

An embodiment may have a computer program with a program code for performing the method for determining a quantized channel vector in a terminal of a Multiple Input Multiple Output communication system as mentioned before, when the computer program runs on a computer or a microcontroller.

Embodiments according to the present invention are based on the central idea that the Channel State Information of a channel between a base station and a terminal of a Multiple Input Multiple Output communication system may be improved by determining the quantized channel vector based on a channel property. A channel property value, for example, a Signal-to-Interference-and-Noise Ratio, a signal-to-noise ratio, the rate of a user or an attenuation parameter may be directly related to the channel quality of the channel between the base station and the terminal. Therefore, the channel may be better characterized by a quantized channel vector based on a channel property and since the Channel State Information is based on the quantized channel vector, the Channel State Information may be improved. An improved Channel State Information may enable a higher sum rate for a downlink transmission in the Multiple Input Multiple Output communication system and therefore, for example, the data rate per user and/or the number of users being simultaneously addressed by the base station may be increased.

In some embodiments according to the invention, the predefined channel property value is a Signal-to-Interference-and-Noise Ratio, a signal-to-noise ratio, the rate of a user or a signal attenuation.

In some further embodiments according to the invention, determining the quantized channel vector comprises determining the largest eigenvalue of an eigenvalue problem. The eigenvalue problem is based on the determined channel quality.

BRIEF DESCRIPTION OF THE DRAWINGS

Embodiments according to the invention will be detailed subsequently, referring to the appended drawings, in which:

FIG. 9a is a "sum rate versus signal-to-noise ratio" diagram; and

FIG. 9b is a table of simulation parameters used for calculating the results shown in FIG. 9a.

DETAILED DESCRIPTION OF THE INVENTION

Although most of the following embodiments are related to one data stream per user/terminal, it is easy to see, that the described concept can also be used for situations with more than one data stream per user.

Figure 1:
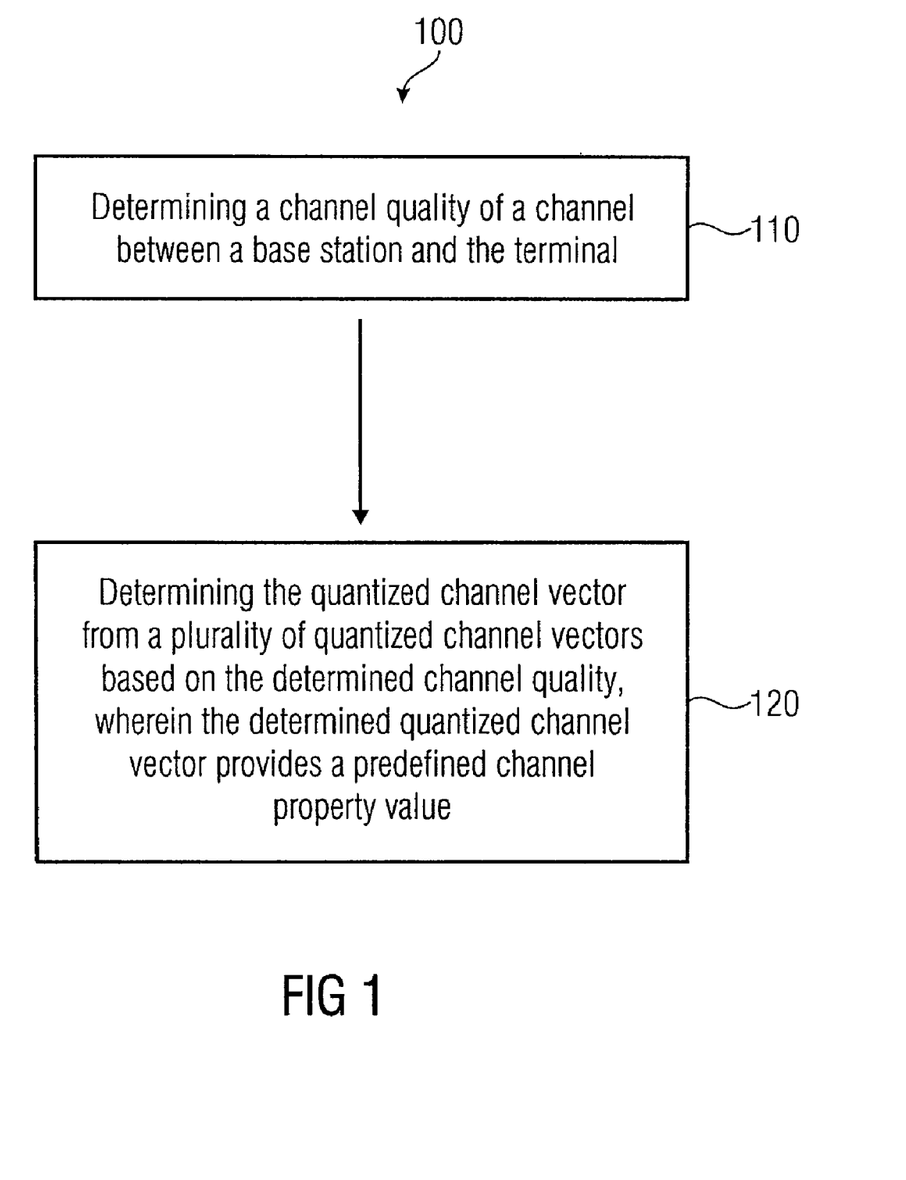
FIG. 1 is a flowchart of a method for determining a quantized channel vector in a terminal of a Multiple Input Multiple Output communication system.

FIG. 1 shows a flowchart of a method 100 for determining a quantized channel vector in a terminal of a Multiple Input Multiple Output communication system according to an embodiment of the invention. This method comprises determining 110 a channel quality of a channel between a base station and the terminal and determining 120 the quantized channel vector from a plurality of quantized channel vectors based on the determined channel quality. The determined quantized channel vector provides a predefined channel property value.

The determined channel quality characterizes the channel between the base station and the terminal and may include, for example, information about a Signal-to-Interference-and-Noise Ratio, a signal-to-noise ratio, a rate of a user and/or a signal attenuation of the channel between the base station and the terminal. The channel quality may vary in time, because the terminal may be, for example, a mobile user like a mobile phone or a laptop, or the environment between the base station and the terminal may change.

Determining the quantized channel vector based on predefined channel property value as, for example, the Signal-to-Interference-and-Noise Ratio, the signal-to-noise ratio, the rate of a user or a signal attenuation may provide an improved characterization of the channel between the base station and the terminal, since the channel property may represent a direct property of the channel.

Improving the channel characterization at the terminal may provide an improved Channel State Information, which can be fed back to the base station. With an improved Channel State Information, the base station may optimize the sum rate for a downlink transmission for terminals to be simultaneously addressed by the base station.

The described principle may also be used for a channel between a terminal and a base station.

For example, the plurality of quantized channel vectors may be contained by a DFT (discrete Fourier transform) codebook, a random codebook or another defined set of quantized channel vectors.

Figure 3:
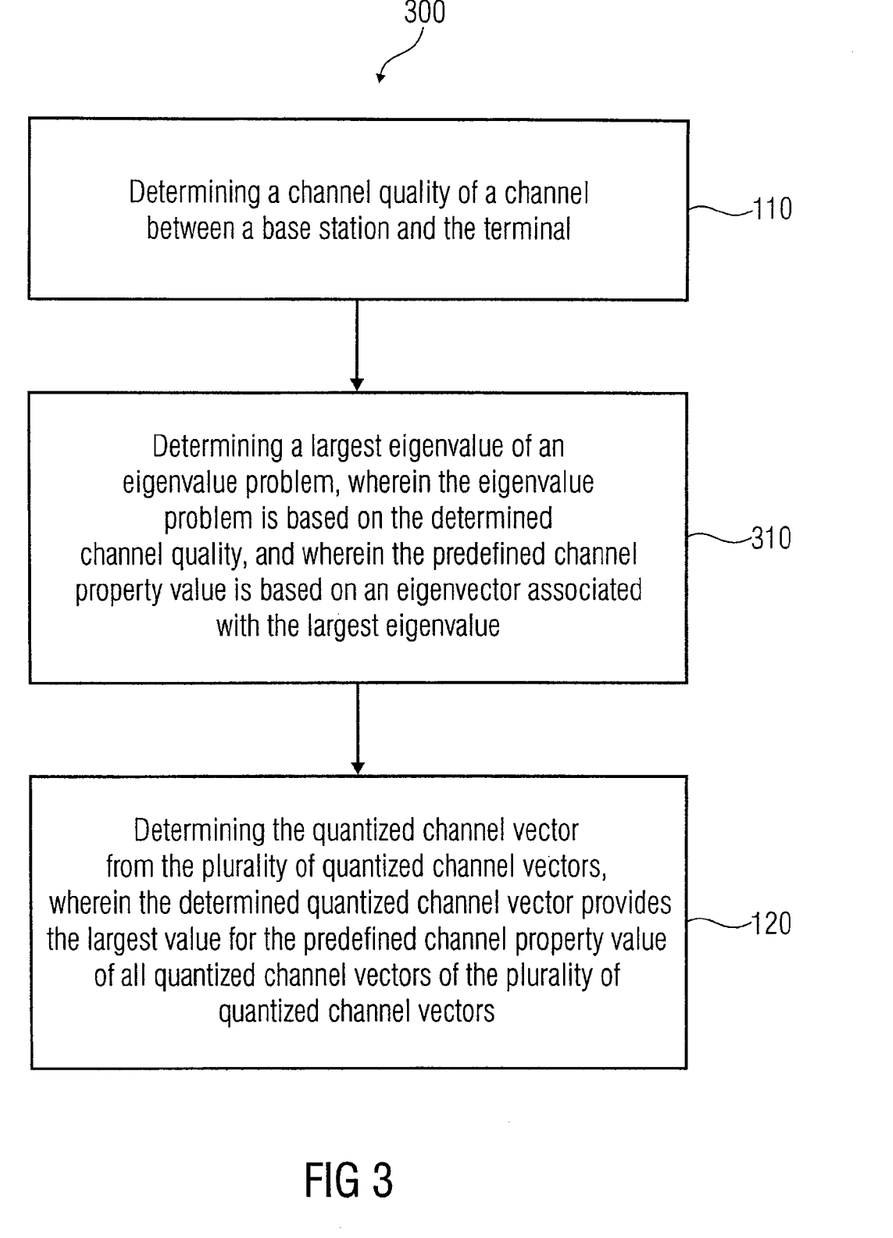
FIG. 3 is a flowchart of a method for determining a quantized channel vector in a terminal of a Multiple Input Multiple Output communication system.

FIG. 3 shows a flowchart of a method 300 for determining a quantized channel vector in a terminal of a Multiple Input Multiple Output communication system according to an embodiment of the invention. The method 300 comprises determining 110 a channel quality of a channel between a base station and the terminal, determining 310 a largest eigenvalue of an eigenvalue problem and determining 120 the quantized channel vector from the plurality of the quantized channel vectors.

The eigenvalue problem is based on the determined channel quality and the predefined channel property value is based on an eigenvector associated with the largest eigenvalue.

The quantized channel vector is determined so that it provides the largest value for the predefined channel property value of all quantized channel vectors of the plurality of quantized channel vectors.

For example, the predefined channel property value may be the Signal-to-Interference-and-Noise Ratio of the channel between the base station and the terminal. Determining the quantized channel vector providing a larger value of the Signal-to-Interference-and-Noise than 70% of all quantized channel vectors of the plurality of quantized channel vectors, one of the three largest values of the Signal-to-Interference-and-Noise Ratio of all quantized channel vectors of the plurality of quantized channel vectors or the largest value of the Signal-to-Interference-and-Noise Ratio of all quantized channel vectors of the plurality of quantized channel vectors may lead to a higher sum rate, since the achievable sum rate depends on the Signal-to-Interference-and-Noise Ratio.

Figure 4:
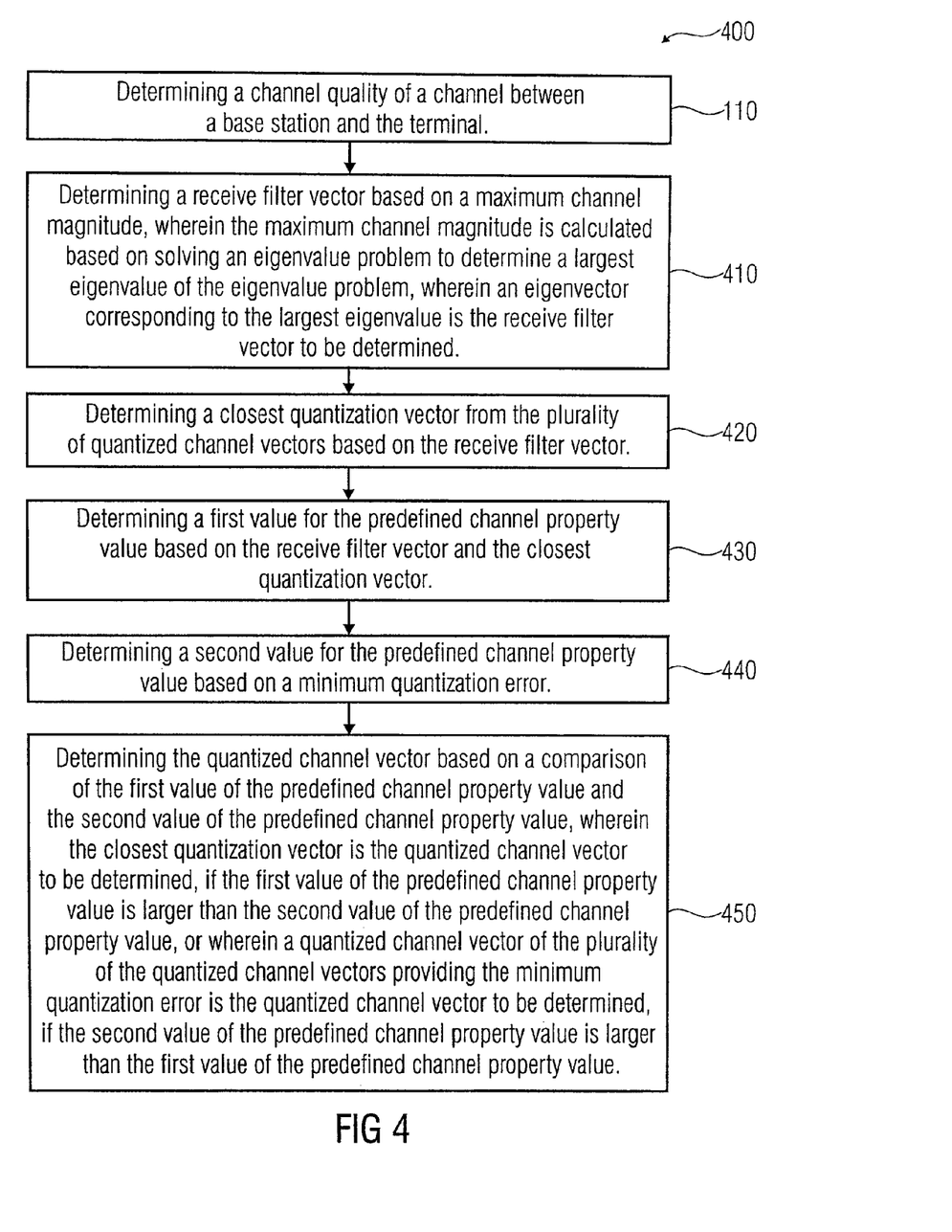
FIG. 4 is a flowchart of a method for determining a quantized channel vector in a terminal of a Multiple Input Multiple Output communication system.

FIG. 4 shows a flowchart of a method 400 for determining a quantized channel vector in a terminal of a Multiple Input Multiple Output communication system according to an embodiment of the invention. The method 400 comprises determining 110 a channel quality of a channel between a base station and the terminal and determining 120 the quantized channel vector from a plurality of quantized channel vectors based on the determined channel quality.

Determining 120 the quantized channel vector comprises determining 410 a receive filter vector based on a maximum channel magnitude, determining 420 a closest quantization vector from the plurality of quantized channel vectors based on the receive filter vector, determining 430 a first value for the predefined channel property value based on the receive filter vector and the closest quantization vector, determining 440 a second value for the predefined channel property value based on a minimum quantization error and determining 450 the quantized channel vector based on a comparison of the first value of the predefined channel property value and the second value of the predefined channel property value.

A maximum channel magnitude may be calculated based on solving an eigenvalue problem to determine a largest eigenvalue of the eigenvalue problem. An eigenvector corresponding to the largest eigenvalue is the receive filter vector to be determined.

If the first value of the predefined channel property value is larger than the second value of the predefined channel property value, the closest quantization vector is the quantized channel vector to be determined. Otherwise, if the second value of the predefined channel property value is larger than the first value of the predefined channel property value, a quantized channel vector of the plurality of quantized channel vectors with the minimum quantization error is the quantized channel vector to be determined.

Some embodiments according to the invention relate to a maximum sum rate based channel vector quantization. A method for CVQ based on the maximization of the SINR expression is proposed. The original CVQ approach from "N. Jindal. A feedback reduction technique for MIMO broadcast channels. Information Theory, 2006 IEEE International Symposium on, pages 2699-2703, July 2006", is only concerned with minimizing the quantization error represented by the quantization angle $\theta_k$. However, the ultimate objective in the system should be to achieve the highest possible sum rate. Due to Eqs. (5) and (6), this may be achieved by maximizing the SINR, which can be approximated via expressions such as Eq. (8).

Due to the above reasons, it is argued that an approach based on the maximization of an SINR expression may prove to yield superior performance in a sum rate sense than simply minimizing the quantization angle. The method may be solely concerned in finding the best effective channel $g_k$ and its quantized version $\hat{g}_k$.

Lets have a look again at the approximate expression for the scaled SINR:

$$\gamma'_k = \frac{\frac{P_{Tx}}{M}\|g_k\|^2\cos^2\theta_k}{1+\frac{P_{Tx}}{M}\|g_k\|^2\sin^2\theta_k}. \tag{12}$$

Note that the above expression will approach $\cotan^2\theta_k$ as $P_{Tx}$ goes to infinity. Therefore, at large SNR, the SINR is almost fully determined by the quantization error, which justifies the minimization of $\theta_k$ in such conditions. However, the situation might be different at lower SNRs.

The proposed approach is to maximize equation (12) over all possible codebook entries and receiver weights of unit norm, i.e., $$(w'_k, \hat{g}'_k) = \underset{(w_k,\hat{g}_k)\in\{C^N:\|w_k\|=1\}\times c}{\operatorname{argmax}} \gamma'_k(w_k, \hat{g}_k), \tag{13}$$

yielding an optimal $\hat{g}'_k$ and $w'_k$. The optimal effective channel $\hat{g}'_k$ is then computed with $g'_k = H_k^T w'_k$. The resulting quantities are the ones then used for the SINR computations according to Eq. (12) by replacing $\hat{g}_k$ and $g_k$ by $\hat{g}'_k$ and $g'_k$, respectively.

In order to perform the above maximization, lets rewrite (12) by substituting $\|g_k\|^2\cos^2\theta_k = \|\hat{g}_k^H g_k\|^2 = g_k^H \hat{g}_k \hat{g}_k^H g_k$, expanding the effective channel $g_k^T = w_k^T H_k$, and using the identity $\sin^2\theta_k = 1-\cos^2\theta_k$ to obtain $$\gamma'_k = \frac{w_k^H\left(\frac{P_{Tx}}{M}H_k^*\hat{g}_k\hat{g}_k^H H_k^T\right)w_k}{w_k^H\left[I+\frac{P_{Tx}}{M}H_k^*(I-\hat{g}_k\hat{g}_k^H)H_k^T\right]w_k} \tag{14}$$

$$= \frac{w_k^H A(\hat{g}_k) w_k}{w_k^H B(\hat{g}_k) w_k}, \tag{15}$$

where $w_k$ is assumed to be unit norm such that $1 = w_k^H I w_k$. It is well known that equations in the form of equation (15) can be maximized over $w_k$ by setting $w_k$ to the eigenvector $v_i$ corresponding to the largest eigenvalue $\mu_i$ solving the generalized eigenvalue problem $Av_i = \mu B v_i$ (e.g., B. Borloz and B. Xerri. Subspace signal-to-noise ratio maximization: the constrained stochastic matched filter. Signal Processing and Its Applications, 2005. Proceedings of the Eighth International Symposium on, 2:735-738, 28-31, 2005. Moreover, if B is invertible, the eigenvalues and eigenvectors are the same as for the regular eigenvalue decomposition of $B^{-1}A$.

Note that this maximization finds the best $w_k$ given a specific codebook entry $\hat{g}'_k$. The optimal $\hat{g}'_k$ is the one yielding the largest maximal SINR over all codebook entries, i.e., $$\hat{g}'_k = \underset{\hat{g}_k \in C}{\operatorname{argmax}} \underset{w_k\in\{C^N:\|w_k\|=1\}}{\max} \frac{w_k^H A(\hat{g}_k) w_k}{w_k^H B(\hat{g}_k) w_k}, \tag{16}$$

and $w'_k$ is the corresponding optimal weight vector for this $\hat{g}'_k$. This method applied directly may increase the computational complexity, since the maximization over $w_k$ needs to be performed for all entries of the channel codebook and thus needs $2^B$ generalized eigenvalue decompositions per sub-carrier where the optimization is performed.

To overcome this last issue, also a pseudo-maximization algorithm as an alternative to the exact maximization of equation (16) is proposed. Note that $\gamma'_k$ is only a function of the channel magnitude $\|g_k\|^2$ and the quantization error $\theta_k$ for a given $P_{Tx}$. The only way to increase $\gamma'_k$ is by increasing $\|g_k\|$ or decreasing $\theta_k$. The assumption is made that $\gamma'_k$ is close to its maximum when either $\|g_k\|$ is maximized or $\theta_k$ is minimized. Therefore, we evaluate $\gamma'_k$ at two specific points, denoted as $(w_k^{(a)}, \hat{g}_k^{(a)})$ and $(w_k^{(b)}, \hat{g}_k^{(b)})$, defined by $$w_k^{(a)} \triangleq \underset{w_k\in\{C^N:\|w_k\|=1\}}{\operatorname{argmax}} \|g_k\|^2 = \underset{w_k\in\{C^N:\|w_k\|=1\}}{\operatorname{argmax}} w_k^H H_k^* H_k^T w_k, \tag{17}$$

$$\hat{g}_k^{(a)} \triangleq \underset{\hat{g}_k \in C}{\operatorname{argmax}}|\hat{g}_k^H g_k^{(a)}| = \underset{\hat{g}_k \in C}{\operatorname{argmax}}|\hat{g}_k^H H_k^T w_k^{(a)}|,$$

and the point $(w_k^{(b)}, \hat{g}_k^{(b)})$, is the minimum quantization error solution that was already presented before. Note that $w_k^{(a)}$ is in the direction of the eigenvector corresponding to the largest eigenvalue of $H_k^* H_k^T$. The increase in computational complexity of the pseudo-maximization solution with respect to the minimum quantization error method therefore may include one (regular) eigenvalue decomposition and one search for the closest quantization vector $\hat{g}_k^{(a)}$).

Finally the pseudo-maximum solution to the SINR maximization problem is computed as $$(w_k^{ps}, \hat{g}_k^{ps}) \triangleq \underset{(w_k, \hat{g}_k) \in \{(w_k^{(a)}, \hat{g}_k^{(a)}),(w_k^{(b)}, \hat{g}_k^{(b)})\}}{\mathrm{argmax}} \gamma'_k(w_k, \hat{g}_k). \quad (18)$$

Some embodiments according to the invention relate to a resource allocation of the base station in a Multiple Input Multiple Output communication system, using zero-forcing (ZF) precoding and the concept described above.

With the quantized composite channel matrix $\hat{G}_K$=cstack $(\hat{g}_k^T)_{k \in K} \in C^{\|K\| \times M}$, the ZF precoder at the base station computes as (e.g. "S. Verdú. *Multiuser Detection*. Cambridge University Press, 1998.")

$$P_K = P'_K \Lambda_K^{1/2}, P'_K = \hat{G}_K^H (\hat{G}_K \hat{G}_K^H)^{-1}, \quad (19)$$

with the diagonal matrix $\Lambda_K \in C^{\|K\| \times \|K\|}$ representing power loading. For simulations equal power loading may be assumed where $$\Lambda_K = \mathrm{diag}\left(\frac{P_{Tx}}{|K| \|P'_K e_k\|_2^2}\right)_{k=1}^{|K|}. \quad (20)$$

Recall that $\|K\|=D$ due to the fact that $d_k=1$ for all $k \in K$.

With the codebook indices and the scaled SINR values of all users, the base station schedules the users and computes the ZF precoder as described before. To do so, it calculates the SINR approximations based on the scaled versions thereof. It holds "M. Trivellato, F. Boccardi, and F. Tosato. User selection schemes for MIMO broadcast channels with limited feedback. Vehicular Technology Conference, 2007. VTC2007-Spring. IEEE 65th, pages 2089-2093, April 2007" or "Philips. Comparison of MU-MIMO feedback schemes with multiple UE receive antennas, January 2006. 3GPP TSG RAN WG1 #47 bis R1-070346".

$$\Gamma_K = \frac{M}{P_{Tx}} \Lambda_K \mathrm{diag}(\gamma'_k)_{k=1}^{|K|}. \quad (21)$$

Then, it schedules the users according to Alg. 1 where $$R_K := \sum_{q \in K} \log_2(1 + e_q^T \Gamma_K e_q).$$

Please see "M. Trivellato, F. Boccardi, and F. Tosato. User selection schemes for MIMO broadcast channels with limited feedback. Vehicular Technology Conference, 2007. VTC2007-Spring. IEEE 65th, pages 2089-2093, April 2007" or "Philips. Comparison between MU-MIMO codebook-based channel reporting techniques for LTE downlink, October 2006. 3GPP TSG RAN WG1 #46 R1-062483" for a detailed description of Alg. 1.

---

Algorithm 1 ZF CVQ resource allocation $K \leftarrow \{\}, \hat{G}_K \leftarrow 0$
while $|K| \leq M$ do
$\quad K' \leftarrow \{k \in \{1,...,K\} \setminus K : \hat{g}_k^T \neq e_q^T \hat{G}_K \, \forall q\}$
$\quad$ for $k \in K'$ do
$\quad\quad \hat{G}_K \leftarrow [\hat{G}_K^T, \hat{g}_k]^T$
$\quad\quad$ compute $P'_{K \cup \{k\}}$ and $\Lambda_{K \cup \{k\}}$ ▷ Eqs. (19) and (20)
$\quad\quad$ compute $\Gamma_K$ ▷ Eq. (21)
$\quad$ end for
$\quad k' \leftarrow \mathrm{argmax}_{k \in K'} R_{K \cup \{k\}}$
$\quad$ if $R_{K \cup \{k'\}} > R_K$ then $K \leftarrow K \cup \{k'\}$
$\quad$ else exit
$\quad$ end if
end while

---

Finally, the set K of scheduled users is used to compute the ZF precoder according to Eqs. (19) and (20).

Some simulation results from the resource allocation algorithm using the described concept, are illustrated below.

The parameters used for the simulations are shown in the Table below. The results for CVQ based on exact and pseudo-maximization of the SINR are compared with those for CVQ based on minimum quantization angle based on these parameters.

| Parameter | Variable | Value |
| --- | --- | --- |
| # Tx ant. | M | 4 |
| # Rx ant. | N | 2 |
| # users | K | 10 |
| Carrier frequency | $f_c = c/\lambda_c$ | 2.0 GHz |
| Bandwidth | $f_{BW}$ | 18 MHz |
| FFT size | $N_{FFT}$ | 2048 |
| # subcarriers | $N_{SC}$ | 1200 |
| # feedback bits | B | 4 |
| Feedback period |  | 1.0 ms |
| SINR quantization |  | No |
| Channel model |  | WINNER |
| Path loss used |  | No |
| BS-UE distance |  | — |
| Ant. spacing at BS | $d_a^{BS}$ | $0.5\lambda_c$ |
| Ant. spacing at UE | $d_a^{UE}$ | $0.5\lambda_c$ |

Figure 5:
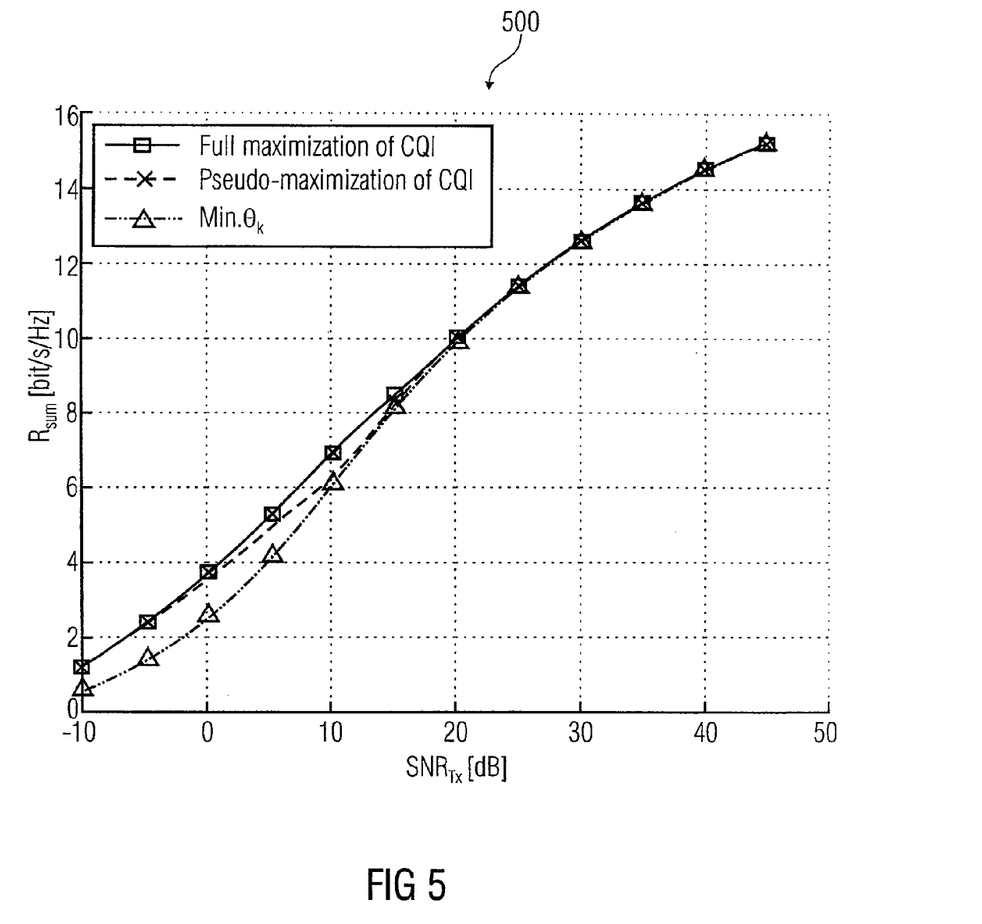
FIG. 5 is a "sum rate versus signal-to-noise ratio" diagram.

Fittingly, FIG. 5 shows a "sum rate versus signal-to-noise ratio" diagram 500. The diagram 500 compares the simulation results for the known minimum quantization angle method, the full maximization of the Channel Quality Information and the pseudo-maximization of the Channel Quality Information. This example shows the performance comparison for the case of random codebook.

FIG. 5 illustrates the performance difference between the CVQ schemes with pseudo maximization and full maximization of a CQI indicator, and compares them with the minimum quantization error approach. A random codebook with B=4 is assumed, where the elements of C are chosen from an isotropic distribution on the M-dimensional unit sphere, i.e., normalized versions of vectors with random entries according to $N_C(0,1)$.

The maximal gain of the pseudo and full maximization schemes over the minimum quantization error one seems to be about 1.2 bit/s/Hz at 0 dB. Moreover, one can see that the pseudo maximization scheme acceptably approaches the performance of the full maximization scheme.

Indeed, the performance gap between the two is never more than about 0.7 bit/s/Hz. Surprisingly, pseudo-maximization and quantization angle minimization are both slightly superior to full maximization in the mid and high SNR zones. This is possible since the SINR measure that is used to perform the maximization does not represent the exact SINR, but is rather an approximation of this quantity. It appears that quantization error minimization may be the best option at mid and high SNR, and that in that range the SINR pseudo-maximization achieves the same performance. As pseudo-maximization makes a choice between the codebook entry that maximizes channel magnitude and the one that minimizes the quantization angle, one can suspect that at high SNR the minimum quantization angle solution is chosen most of the time, such that no performance difference is noticeable with the scheme that only chooses the entry with the minimum quantization angle.

To conclude the CVQ discussion, one also notes that the pseudo-maximization scheme needs much less computational complexity than full maximization. Due to the above results, it also appears that pseudo-maximization performs better or equivalently to quantization angle minimization, and that not much may be gained by using full maximization (it can even cause slight performance degradation in certain SNR ranges). The pseudo-maximization scheme produce significant sum rate gains with respect to the quantization angle minimization scheme in the low SNR region.

Figure 6:
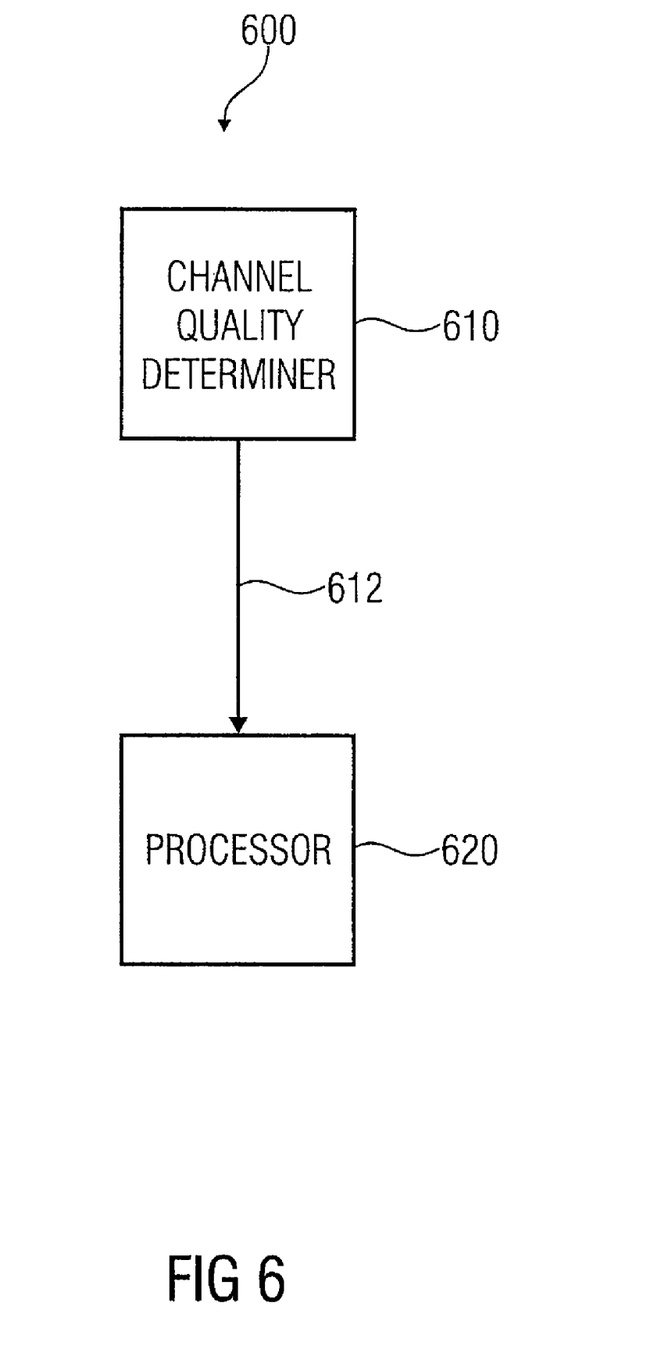
FIG. 6 is a block diagram of an apparatus for determining a quantized channel vector in a terminal of a Multiple Input Multiple Output communication system.

FIG. 6 shows a block diagram of an apparatus 600 for determining a quantized channel vector in a terminal of a Multiple Input Multiple Output communication system according to an embodiment of the invention. The apparatus 600 comprises a channel quality determiner 610 and a processor 620.

The channel quality determiner 610 determines a channel quality 612 of a channel between the base station and the terminal.

The processor 620 determines the quantized channel vector from a plurality of quantized channel vectors based on the determined channel quality 612. The determined quantized channel vector provides a predefined channel property value.

Some embodiments according to the invention relate to a channel vector quantization method aiming at maximum sum rate. In this case, the estimated receive filter vector and the quantized composite channel vector are determined such that the resulting Signal-to-Interference-and-Noise Ratio (SINR), or an approximation thereof, is maximized. Since the SINR is related to the individual user rates, and therefore related to the sum rate of the system, the presented solution aims at maximizing the resulting sum rate.

Figure 7:
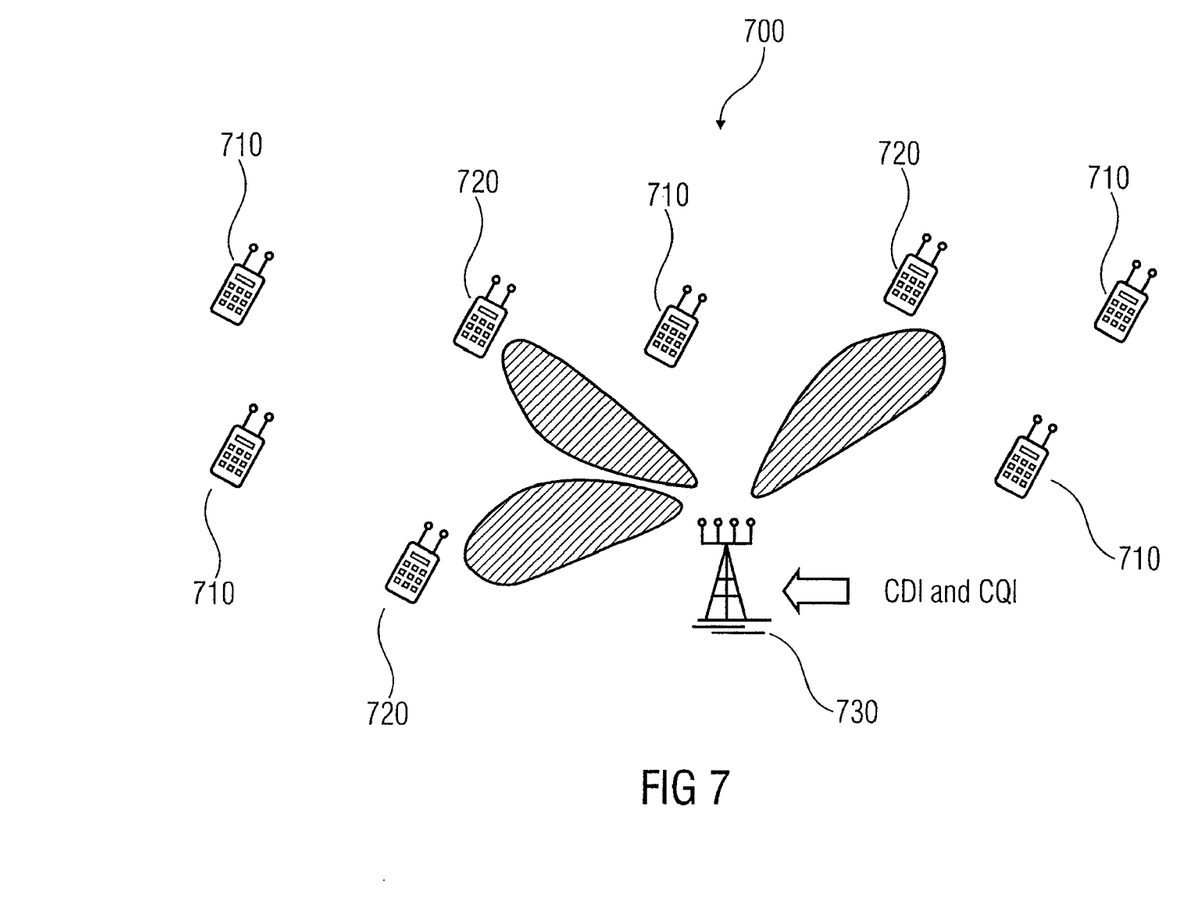
FIG. 7 is a schematic illustration of a multiuser Multiple Input Multiple Output system model.

This may be implemented in a multiuser multiple-input multiple-output (MIMO) system model 700, for example, shown in FIG. 7. It shows a plurality of terminals 710 with terminals 720 being simultaneously addressed by a base station 730.

A mitigation of multiuser interference may be done by linear precoding, for example, Zero-Forcing (ZF) at the transmitter/eNB (enhanced Node B) and scheduling, for example, with a greedy algorithm aiming at high sum rate. This may need a Channel State Information (CSI) at the transmitter/eNB (at the base station). A channel state information may be represented by a Channel Direction Information (CDI) via Channel Vector Quantization (CVQ) and a Channel Quality Information (CQI), for example, a Signal-to-Interference-and-Noise ratio (SINR).

The quantization of a channel-receiver chain vector $g_k = H_k^T w_k$ (the composite channel vector) may be done by choosing a codebook entry with minimum Euclidean distance to $g_k$. A problem is that the channel-receive chain vector is not known at the quantization step, because it depends on the precoder (used by the base station). One possibility may be to estimate the composite channel vector by choosing the closest vector (minimum Euclidean distance) in the range space of the transpose channel matrix.

Figure 8:
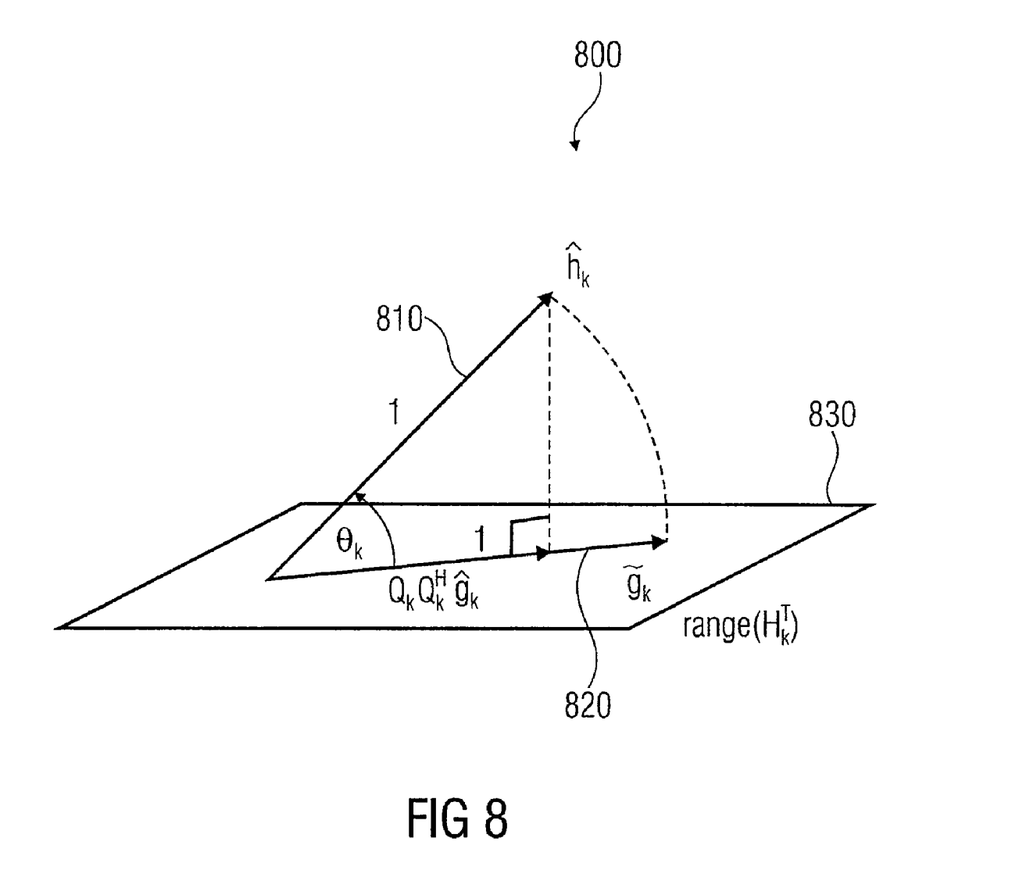
FIG. 8 is a schematic illustration of an Euclidean distance based channel vector quantization.

Fittingly, FIG. 8 shows a schematic illustration of a channel vector quantization 800. It shows a quantized composite channel vector 810 with the closest codebook entry to the range space 830 of transpose channel matrix as a channel direction indication. Further, it shows an estimated composite channel vector 820 needed for the channel quality information computation. The range space 830 of the transpose channel matrix comprises all possible composite channel vectors.

A problem of the state-of-the-art technique is that the Euclidean criterion is not directly related to the system sum rate or cell throughput. The composite channel vectors should be quantized such that the individual user rate or Signal-to-Interference-Noise Ratio, respectively, is maximized aiming at maximum sum rate.

The solution may need computationally intense generalized eigenvalue problems at the receiver, increasing linearly with the codebook size. Therefore, also a suboptimal solution (pseudo-maximization) has been derived. In this case, compared to the Euclidean distance based channel vector quantization, only one additional eigenvalue decomposition and one additional codebook search is needed.

Figure 9:
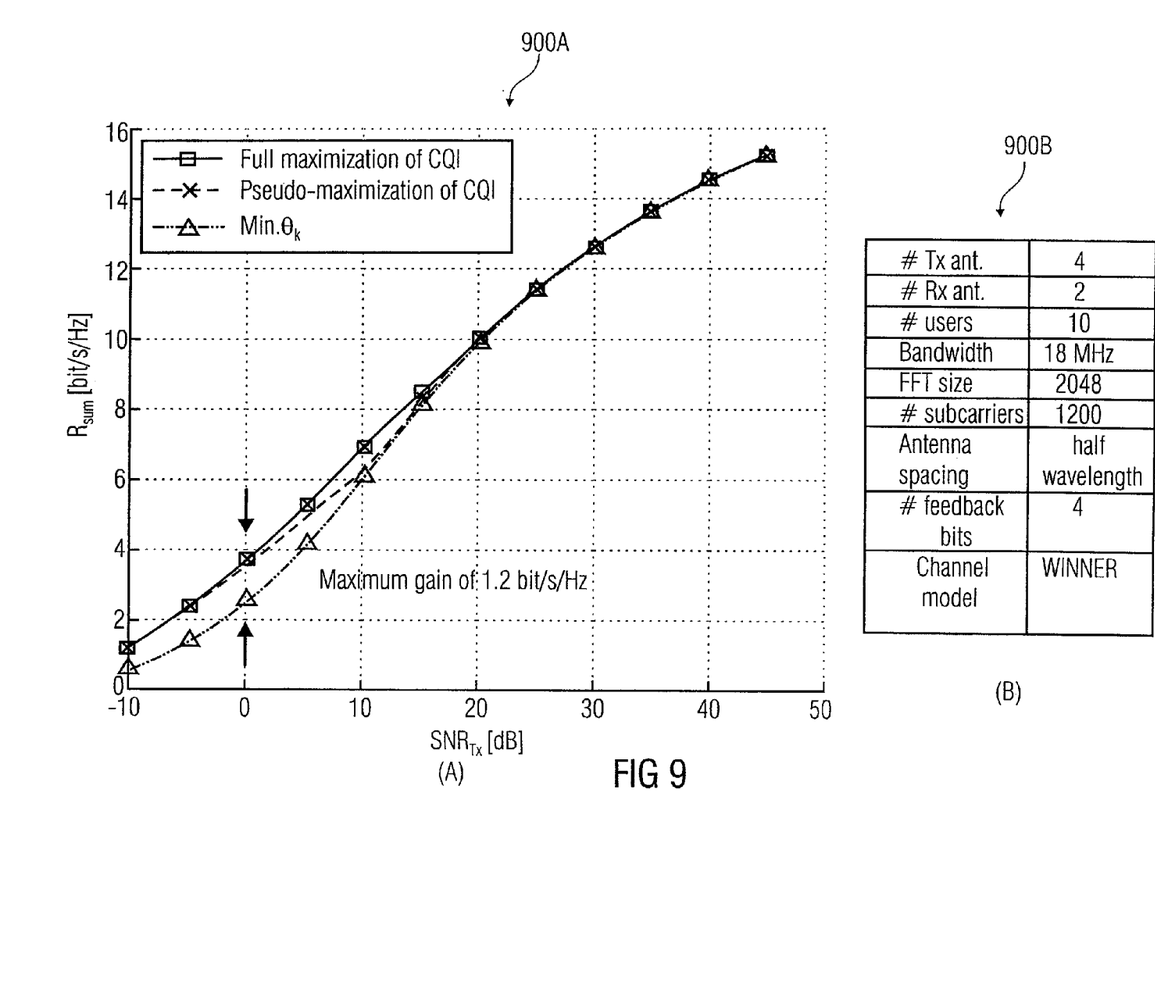

For example, FIG. 9a shows a "sum rate versus signal-to-noise ratio" diagram 900a comparing the system performance of the known minimum quantization angle method, the full maximization of the Channel Quality Information and the pseudo-maximization of the Channel Quality Information. Fittingly, FIG. 9b shows a Table 900B of the simulation parameters used for calculating the results shown in FIG. 9a.

The proposed approach may increase sum rate or cell throughput compared to state-of-the-art techniques, especially in the low signal-to-noise ratio region. However, computational complexity is not increased tremendously.

A higher cell throughput in this case means higher data rates and/or more users per cell (per base station).

Alternatively to increasing the cell throughput, the described approach can be used to decrease transmit power resulting in less costs for power consumption at the base station and/or less electromagnetic radiation.

The proposed channel vector quantization method aims at maximizing sum rate instead of minimizing the Euclidean distance, which is not the final objective of system design. An up to 1.2 bits per second per Hz gain in sum rate can be achieved at the low signal-to-noise ration region. Computational complexity at the receiver may be only slightly increased if a suboptimal approach is chosen.

In the present application, the same reference numerals are partly used for objects and functional units having the same or similar functional properties.

In particular, it is pointed out that, depending on the conditions, the inventive scheme may also be implemented in software. The implementation may be on a digital storage medium, particularly a floppy disk or a CD with electronically readable control signals capable of cooperating with a programmable computer system so that the corresponding method is executed. In general, the invention thus also consists in a computer program product with a program code stored on a machine-readable carrier for performing the inventive method, when the computer program product is executed on a computer. Stated in other words, the invention may thus also be realized as a computer program with a program code for performing the method, when the computer program product is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for determining a codebook entry in a terminal of a Multiple Input Multiple Output communication system, the method comprising:
determining a codebook entry by maximizing a Signal-to-Interference-and-Noise Ratio over all possible codebook entries and receiver weights, wherein the codebook comprises a plurality of quantized channel vectors, and wherein the codebook entry is a quantized channel vector of a channel between a base station and a terminal of a Multiple Input Multiple Output communication system; and
selecting the codebook entry and receiver weights corresponding to the largest Signal-to-Interference-and-Noise Ratio;
wherein determining the codebook entry is done based on $$\hat{g}'_k = \underset{\hat{g}_k \in C}{\operatorname{argmax}} \max_{w_k \in \{C^N : \|w_k\|=1\}} \frac{w_k^H A(\hat{g}_k) w_k}{w_k^H B(\hat{g}_k) w_k},$$

with $$A(\hat{g}_k) = \left(\frac{P_{Tx}}{M} H_k^* \hat{g}_k \hat{g}_k^H H_k^T\right),$$

and $$B(\hat{g}_k) = \left[I + \frac{P_{Tx}}{M} H_k^* (I - \hat{g}_k \hat{g}_k^H) H_k^T\right],$$

wherein $\hat{g}'_k$ is the codebook entry to be determined, $\hat{g}_k$ is a codebook entry of a plurality of codebook entries, $w_k$ is a receive filter vector and relates to a linear receive filter of the terminal, N is a number of receive antennas, $P_{tx}$ is a transmit power, $H_k$ is a channel matrix of the terminal, I is an identity matrix, and M is a number of antennas of the base station.

2. The method according to claim 1, wherein the maximization of the Signal-to-Interference-and-Noise Ratio over all possible codebook entries and receiver weights is performed by setting the receiver weight to an eigenvector corresponding to a largest eigenvalue solving a generalized eigenvalue problem.

3. A method for determining a codebook entry in a terminal of a Multiple Input Multiple Output communication system, the method comprising:
maximizing a squared Euclidean norm of a composite channel vector over receiver weights;
selecting the receiver weight corresponding to the composite channel vector providing the maximal squared Euclidean norm of a composite channel vector;
maximizing over all possible codebook entries of a plurality of codebook entries a scalar product of a codebook entry of the plurality of codebook entries and a composite channel vector associated with the selected receiver weight, wherein the codebook comprises a plurality of quantized channel vectors, and wherein the codebook entry is a quantized channel vector of a channel between a base station and the terminal; and
selecting the codebook entries to be determined corresponding to the maximal scalar product.

4. The method according to claim 3, wherein determining the codebook entry is done based on $$(w_k^{ps}, \hat{g}_k^{ps}) \triangleq \underset{(w_k, \hat{g}_k) \in \{(w_k^{(a)}, \hat{g}_k^{(a)}), (w_k^{(b)}, \hat{g}_k^{(b)})\}}{\operatorname{argmax}} \gamma'_k(w_k, \hat{g}_k) \cdot$$

with $$\hat{g}_k^{(a)} \triangleq \underset{\hat{g}_k \in C}{\operatorname{argmax}} |\hat{g}_k^H g_k^{(a)}| = \underset{\hat{g}_k \in C}{\operatorname{argmax}} |\hat{g}_k^H H_k^T w_k^{(a)}|,$$

and with $$w_k^{(a)} \triangleq \underset{w_k \in \{C^N : \|w_k\|=1\}}{\operatorname{argmax}} \|g_k\|^2 = \underset{w_k \in \{C^N : \|w_k\|=1\}}{\operatorname{argmax}} w_k^H H_k^* H_k^T w_k,$$

wherein $\hat{g}_k^{ps}$ is the codebook entry to be determined, $w_k^{ps}$ is a receive filter vector associated to the codebook entry to be determined, $\hat{g}_k^{(a)}$ is a closest quantization vector, $w_k^{(a)}$ is a receive filter vector associated to the maximum channel magnitude, $\hat{g}_k^{(b)}$ is the codebook entry which has a minimum Euclidean distance to the composite channel vector corresponding to $w_k^{(b)}$, $w_k^{(b)}$ is a minimum mean square error filter, $\gamma'_k$ is a Signal-to-Interference-and-Noise Ratio, $\hat{g}_k$ is a codebook entry of the plurality of codebook entries, $g_k^{(a)} = H_k^T w_k^{(a)}$, $H_k$ is a channel matrix corresponding to the determined channel quality, $g_k = H_k^T w_k$, $w_k$ is a receive filter vector and relates to a linear receive filter of the terminal, and N is a number of receive antennas.

5. An apparatus for determining a codebook entry in a terminal of a Multiple Input Multiple Output communication system, the apparatus comprising:
a processor configured to
determine a codebook entry by maximizing a Signal-to-Interference-and-Noise Ratio over all possible codebook entries and receiver weights, wherein the codebook comprises a plurality of quantized channel vectors, and wherein the codebook entry is a quantized channel vector of a channel between a base station and a terminal, and
select the codebook entry and receiver weights corresponding to the largest Signal-to-Interference-and-Noise Ratio;
wherein the processor is configured to determine the codebook entry based on $$\hat{g}'_k = \underset{\hat{g}_k \in C}{\operatorname{argmax}} \max_{w_k \in \{C^N : \|w_k\|=1\}} \frac{w_k^H A(\hat{g}_k) w_k}{w_k^H B(\hat{g}_k) w_k}, \text{ with}$$

$$A(\hat{g}_k) = \left(\frac{P_{Tx}}{M} H_k^* \hat{g}_k \hat{g}_k^H H_k^T\right), \text{ and}$$

$$B(\hat{g}_k) = \left[I + \frac{P_{Tx}}{M} H_k^* (I - \hat{g}_k \hat{g}_k^H) H_k^T\right],$$

wherein $\hat{g}'_k$ is the codebook entry to be determined, $\hat{g}_k$ is a codebook entry of a plurality of codebook entries, $w_k$ is a receive filter vector and relates to a linear receive filter of the terminal, N is a number of receive antennas, $P_{tx}$ is a transmit power, $H_k$ is a channel matrix of the terminal, I is an identity matrix, and M is a number of antennas of the base station.

6. A non-transitory storage medium having stored there on a computer program having a program code for performing, when running on a computer, a method for determining a codebook entry in a terminal of a Multiple Input Multiple Output communication system, the method comprising:
   determining a codebook entry by maximizing a Signal-to-Interference-and-Noise Ratio over all possible codebook entries and receiver weights, wherein the codebook comprises a plurality of quantized channel vectors; and
   selecting the codebook entry and receiver weights corresponding to the largest Signal-to-Interference-and-Noise Ratio;
   wherein determining the codebook entry is done based on $$\hat{g}'_k = \underset{\hat{g}_k \in C}{\operatorname{argmax}} \ \underset{w_k \in \{C^N : \|w_k\|=1\}}{\max} \frac{w_k^H A(\hat{g}_k) w_k}{w_k^H B(\hat{g}_k) w_k}, \quad \text{with}$$

$$A(\hat{g}_k) = \left(\frac{P_{Tx}}{M} H_k^* \hat{g}_k \hat{g}_k^H H_k^T\right), \text{ and}$$

$$B(\hat{g}_k) = \left[I + \frac{P_{Tx}}{M} H_k^*(I - \hat{g}_k \hat{g}_k^H) H_k^T\right],$$

wherein $\hat{g}'_k$ is the codebook entry to be determined, $\hat{g}_k$ is a codebook entry of a plurality of codebook entries, $w_k$ is a receive filter vector and relates to a linear receive filter of the terminal, N is a number of receive antennas, $P_{Tx}$ is a transmit power, $H_k$ is a channel matrix of the terminal, I is an identity matrix, and M is a number of antennas of the base station.

7. An apparatus for determining a quantized channel vector in a terminal of a Multiple Input Multiple Output communication system, the apparatus comprising:
   a processor configured to
      maximize a squared Euclidean norm of a composite channel vector over receiver weights,
      select the receiver weight corresponding to the composite channel vector providing the maximal squared Euclidean norm of a composite channel vector,
      maximize over all possible codebook entries of a plurality of codebook entries a scalar product of a codebook entry of the plurality of codebook entries and a composite channel vector associated with the selected receiver weight, wherein the codebook comprises a plurality of quantized channel vectors, and wherein the codebook entry is a quantized channel vector of a channel between a base station and the terminal; and
      select the codebook entries to be determined corresponding to the maximal scalar product.

8. A non-transitory storage medium having stored there on a computer program having a program code for performing, when running on a computer, a method for determining a codebook entry in a terminal of a Multiple Input Multiple Output communication system, the method comprising:
   maximizing a squared Euclidean norm of a composite channel vector over receiver weights;
   selecting the receiver weight corresponding to the composite channel vector providing the maximal squared Euclidean norm of a composite channel vector;
   maximizing over all possible codebook entries of a plurality of codebook entries a scalar product of a codebook entry of the plurality of codebook entries and a composite channel vector associated with the selected receiver weight, wherein the codebook comprises a plurality of quantized channel vectors, and wherein the codebook entry is a quantized channel vector of a channel between a base station and the terminal; and
   selecting the codebook entries to be determined corresponding to the maximal scalar product.

* * * * *